United States Patent
Zwettler et al.

(10) Patent No.: US 6,989,204 B2
(45) Date of Patent: Jan. 24, 2006

(54) MAGNETIC RECORDING MEDIUM HAVING A DIMENSIONALLY STABLE SUBSTRATE

(75) Inventors: Christopher J. Zwettler, Lake Elmo, MN (US); Christopher A. Merton, Hammond, WI (US); Ramnath Subramaniam, Woodbury, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 10/874,094

(22) Filed: Jun. 22, 2004

(65) Prior Publication Data

US 2005/0282046 A1 Dec. 22, 2005

(51) Int. Cl.
*G11B 5/73* (2006.01)

(52) U.S. Cl. .................................. 428/846.6; 428/846.9

(58) Field of Classification Search .................. 428/323, 428/694 ST, 846.6, 846.9
See application file for complete search history.

(56) References Cited

U.S. PATENT DOCUMENTS

| | | | | |
|---|---|---|---|---|
| 4,015,030 A | * | 3/1977 | Sasazawa et al. | 427/130 |
| 4,388,368 A | * | 6/1983 | Hibino et al. | 428/336 |
| 4,420,532 A | * | 12/1983 | Yamaguchi et al. | 428/329 |
| 4,833,031 A | * | 5/1989 | Kurokawa et al. | 428/336 |
| 6,144,525 A | * | 11/2000 | Chang | 360/133 |
| 6,482,330 B1 | * | 11/2002 | Bajorek | 216/22 |

FOREIGN PATENT DOCUMENTS

EP 1044788 * 10/2000

* cited by examiner

*Primary Examiner*—Stevan A. Resan
(74) *Attorney, Agent, or Firm*—Eric D. Levinson

(57) ABSTRACT

A magnetic recording medium which includes a substrate having a front side and a backside, a longitudinal direction and a cross-web direction, with a particulate/binder or thin film magnetic layer formed over the front side of the substrate, wherein the magnetic medium has a cross-web dimensional difference from the magnetic recording head used therewith of less than 900 $\mu$m/meter over a 35° C. temperature range, and over a 70% relative humidity range. Preferred substrates include thin metals, metal alloys, and thin glass films.

17 Claims, No Drawings

MAGNETIC RECORDING MEDIUM HAVING A DIMENSIONALLY STABLE SUBSTRATE

THE FIELD OF THE INVENTION

The present invention relates generally to magnetic recording media such as a magnetic tape, more specifically to a dimensionally stable substrate for such a recording medium.

BACKGROUND OF THE INVENTION

Magnetic recording media are widely used in audio tapes, video tapes, computer tapes, disks and the like. Magnetic media may use thin metal layers as the recording layers, or may comprise coatings containing magnetic particles as the recording layer. The latter type of recording media employs particulate materials such as ferromagnetic iron oxides, chromium oxides, ferromagnetic alloy powders and the like dispersed in binders and coated on a substrate. In general terms, magnetic recording media generally comprise a magnetic layer coated onto at least one side of a non-magnetic substrate (e.g., a film for magnetic recording tape applications).

In certain designs, the magnetic coating (or "front coating") is formed as a single layer directly onto a non-magnetic substrate. In an alternative approach, the front coating is a dual-layer construction, including a support layer on the substrate and a thin magnetic layer (or "upper layer") formed directly on the support or lower layer. With this construction, the lower layer is thicker than the magnetic layer. The support layer is typically non-magnetic and generally comprised of a non-magnetic powder dispersed in a binder. Conversely, the upper layer comprises a magnetic metal particle powder or pigment dispersed in a binder system. The formulation for the magnetic layer is optimized to maximize the performance of the magnetic recording medium in such areas as signal-to-noise ratios, pulsewidth, and the like.

Magnetic tapes may also have a backside coating applied to the opposing side of the non-magnetic substrate in order to improve the durability, electrical conductivity, and tracking characteristics of the media. As with the front coatings, the backside coatings are typically combined with a suitable solvent to create a homogeneous mixture which is then coated onto the substrate, after which the coating is dried, calendered if desired, and then cured. The formulation for the backside coating or layer also comprises pigments and a binder system.

The magnetic recording medium is formed on a non-magnetic substrate. Conventionally used substrate materials include polyesters such as polyethylene terephthalate (PET), polyethylene naphthalate (PEN), and mixtures thereof; polyolefins (e.g., polypropylene); cellulose derivatives; polyamides; and polyimides. However, such substrates do not add to the dimensional stability of the magnetic recording medium. Further, polymeric films have low modulus values, are sensitive to humidity and have modest strength and durability. Changes in the polymeric substrates to improve certain characteristics can mandate changes in the coating thickness as well, which requires additional research and development.

It would be desirable to have a substrate that would maximize the dimensional stability of the magnetic recording medium formed thereon. It would be beneficial for the final magnetic recording medium product to exhibit low hygroscopic expansion, low thermal expansion, and low expansion under applied stress in order to improve the track density and minimize any overwriting of data. It would also be desirable to have a substrate with increased tensile strength and edge durability.

It has now been discovered that a magnetic recording medium which includes a substrate having a front side and a backside, with a particulate/binder magnetic layer formed over the front side of the substrate, wherein the magnetic medium has a cross-web dimensional difference from the magnetic recording head used therewith of less than 900 $\mu$m/meter over a temperature range of about 35° C., and over a 70% relative humidity range will provide superior track density.

It has further been discovered that a magnetic recording medium using a metal or glass film substrate will provide additional dimensional stability without requiring changes in the coating thicknesses due to the substrate having a zero hygroscopic expansion.

SUMMARY OF THE INVENTION

The invention provides a magnetic recording medium which includes a substrate having a front side and a backside, a longitudinal direction and a cross-web direction, with a magnetic layer formed over the front side of the substrate, wherein the magnetic medium has a cross-web dimensional difference from the magnetic recording head used therewith of less than 900 $\mu$m/meter over a 35° C. temperature range, and over a 70% relative humidity range (e.g., from 10% to 80% RH).

In one embodiment, the invention provides a magnetic recording medium including a metal substrate, such substrate preferably having a thickness of less than about 20 $\mu$m.

Specifically, one embodiment of the invention provides a magnetic recording medium including a substrate comprising a glass film, such substrate preferably having a thickness of less than about 20 $\mu$m.

In one embodiment, the invention provides a magnetic recording medium having a cross-web dimensional difference from the magnetic recording head used therewith of less than 500 $\mu$m/meter over a 70% relative humidity range.

The substrate has a magnetic coating coated onto the front side, and may have a backside coating on the opposing side of the substrate. The magnetic layer may contain one or more metallic particulate pigments, and a binder system therefor. With a ferromagnetic magnetic recording layer, there may also be an optional support layer or sublayer which is coated directly onto the substrate and, in such cases, the magnetic recording layer is coated atop the sublayer. The magnetic recording layer may also comprise a magnetic thin film. An optional back coating may be formed on the opposing surface of the substrate, comprising carbon black dispersed in a binder.

One magnetic recording medium of the invention comprises a substrate having a front side and a backside, a magnetic layer formed over the front side of the substrate comprising magnetic pigment particles, and a binder system therefor; wherein the substrate is selected from the group consisting of metal and glass, said substrate having a thickness of less than about 20 $\mu$m.

In another embodiment, a magnetic recording medium of the invention comprises a substrate having a front side and a backside, a magnetic layer comprising a metal selected from the group consisting of cobalt, cobalt chrome, cobalt nickel, cobalt chrome platinum and cobalt platinum formed over the front side of the substrate wherein the substrate is selected from the group consisting of metal and glass, said substrate having a thickness of less than about 20 μm.

In another embodiment, the magnetic recording medium of the invention has a substrate which is nickel.

These terms when used herein have the following meanings.

1. The term "coating composition" means a composition suitable for coating onto a substrate.

2. The terms "layer" and "coating" are used interchangeably to refer to a coated composition.

4. The terms "back coating" and "backside coating" are synonymous and refer to a coating on the opposing side of the substrate from a magnetic layer.

5. The term "vinyl" when applied to a polymeric material means that the material comprises repeating units derived from vinyl monomers. When applied to a monomeric material, the term "vinyl" means that the monomer contains a moiety having a free-radically polymerizable carbon—carbon double bond.

6. The term "resistivity" means the surface electrical resistance measured in Ohms/square.

7. The term "Tg" means glass transition temperature.

8. The term "coercivity" means the intensity of the magnetic field needed to reduce the magnetization of a ferromagnetic material to zero after it has reached saturation, taken at a saturation field strength of 10,000 Oersteds.

9. The term "Oersted", abbreviated as Oe, refers to a unit of magnetic field in a dielectric material equal to $1/\mu$ Gauss, where $\mu$ is the magnetic permeability.

10. The term "tape" is used synonymously with the term "magnetic recording medium" and means a substrate coated with at least a magnetic coating on the front side of the substrate.

All weights, amounts and ratios herein are by weight, unless otherwise specifically noted.

DETAILED DESCRIPTION OF THE PREFERRED EMBODIMENTS

The following detailed description describes certain embodiments and is not to be taken in a limiting sense. The scope of the present invention is defined by the appended claims.

The magnetic recording medium includes a substrate, a magnetic layer, and optionally, a sublayer and a backside layer. The various components are described in greater detail below. In general terms, however, the magnetic layer includes either a thin metal coating or a primary magnetic metal pigment, and a binder for the pigment. The substrate has high dimensional stability related to the recording head and may comprise metal or glass.

In one embodiment, the magnetic recording medium may be a dual-layer magnetic recording medium having a support layer coated on the front side of the substrate, with the magnetic layer being coated atop the support layer.

Substrate

Magnetic recording media of the invention comprise a magnetic recording medium for use with a magnetic recording head, comprising a substrate having a magnetic layer formed over the front side of said substrate, which comprises magnetic pigment particles, and a binder system therefor; wherein the magnetic recording medium has a cross-web dimensional difference from the magnetic recording head of less than 900 μm/meter over a 35° C. temperature range, and over a 70% relative humidity range, e.g., from 10% to 80% relative humidity.

Preferred substrates for use in a magnetic recording medium of the invention include metal, metal alloys, and glass films. In at least one embodiment comprising a substrate having a magnetic layer formed thereover, the magnetic recording medium has a cross-web dimensional difference from the magnetic recording head of less than 500 μm/meter over a 70% relative humidity range, e.g., from 10% to 80% relative humidity.

The Magnetic Recording Layer

In accordance with the current invention, the magnetic recording layer is a thin layer, being preferably from about 1 microinch (0.025 μm) to about 10 microinches (0.25 μm) in thickness, preferably from about 0.025 μm to 0.20 μm.

If a particulate magnetic recording layer is desired, the magnetic metal particle pigments have a composition including, but not limited to, metallic iron and/or alloys of iron with cobalt and/or nickel, and magnetic or non-magnetic oxides of iron, other elements, or mixtures thereof. Alternatively, the magnetic particles can be composed of hexagonal ferrites such as barium ferrites. In order to improve the required characteristics, the preferred magnetic powder may contain various additives, such as semi-metal or non-metal elements and their salts or oxides such as Al, Nd, Si, Co, Y, Ca, Mg, Mn, Na, etc. The selected magnetic powder may be treated with various auxiliary agents before it is dispersed in the binder system, resulting in the primary magnetic metal particle pigment. Preferred pigments have an average particle length no greater than about 75 μm. Such pigments are readily commercially available from companies such as Toda Kogyo and Dowa Mining Company.

In addition to the preferred primary magnetic metal particle pigment described above, the magnetic layer further includes soft spherical particles. Most commonly these particles are comprised of carbon black. A small amount, preferably less than about 3%, of at least one large particle carbon material may also be included, preferably a material that includes spherical carbon particles. The large particle carbon materials have a particle size on the order of from about 50 to about 500 nm, more preferably from about 70 to about 300 nm. Spherical large carbon particle materials are known and commercially available, and in commercial form can include various additives such as sulfur to improve performance. The remainder of the carbon particles present in the upper layer are small carbon particles, i.e., the particles have a particle size on the order of less than 100 nm, preferably less than about 50 nm.

The magnetic layer also includes an abrasive or head cleaning agent (HCA) component. One preferred HCA component is aluminum oxide. Other abrasive grains such as silica, $ZrO_2$, $Cr_2O_3$, etc., can also be employed, either alone or in mixtures with aluminum oxide or each other.

The binder system associated with the magnetic layer preferably incorporates at least one binder resin, such as a thermoplastic resin, in conjunction with other resin components such as binders and surfactants used to disperse the HCA, a surfactant (or wetting agent), and one or more hardeners. In one preferred embodiment, the binder system of the magnetic layer includes at least one hard resin component and at least one soft resin component in conjunction with the other binder components. Hard resin components typically have a glass transition temperature (Tg) of at least about 70° C., and soft resin components typically have a glass transition temperature of less than about 68° C.

In one embodiment, the magnetic layer comprises a binder system comprising a polyurethane resin and a non-halogenated vinyl resin. Examples of polyurethanes include polyether-polyurethane, polyester-polyurethane, polycarbonate-polyurethane, polyester-polycarbonate-polyurethane, and polycaprolactone-polyurethane. Non-halogenated vinyl resins comprised of styrene and acrylonitrile monomers can also be employed with the primary polyurethane binder, if desired.

In one preferred embodiment, the primary polyurethane binder is incorporated into the magnetic layer in an amount of from about 2 to about 10 parts by weight, and preferably from about 4 to about 8 parts by weight, based on 100 parts by weight of the primary upper layer pigment, and the non-halogenated vinyl binder is incorporated in an amount of from about 7 to about 15 parts by weight, and preferably from about 8 to about 10 parts by weight, based on 100 parts by weight of the primary magnetic layer pigment.

The binder system further preferably includes an HCA binder used to disperse the selected HCA material, such as a polyurethane paste binder (in conjunction with a pre-dispersed or paste HCA). Alternatively, other HCA binders compatible with the selected HCA format (e.g., powder HCA) are acceptable. As with other ingredients, HCA may be added to the main dispersion separately or dispersed in the binder system, and then added to the main dispersion.

The magnetic layer may further contain one or more lubricants such as a fatty acid and/or a fatty acid ester. The incorporated lubricant(s) exists throughout the front coating and, importantly, at the surface thereof the magnetic layer. The lubricant(s) reduces friction to maintain smooth contact with low drag, and protects the media surface from wear. In dual-layer media, lubricant(s) are generally provided in both the upper and lower layers, and are preferably selected and formulated in combination.

Preferred fatty acid lubricants include at least 90 percent pure stearic acid. Although technical grade acids and/or acid esters can also be employed for the lubricant component, incorporation of high purity lubricant materials ensures robust performance of the resultant medium. Other acceptable fatty acids include one or more of myristic acid, palmitic acid, oleic acid, etc., and their mixtures. The magnetic layer formulation can further include one or more fatty acid esters such as butyl stearate, isopropyl stearate, butyl oleate, butyl palmitate, butyl myristate, hexadecyl stearate, and oleyl oleate.

In a preferred embodiment, the lubricant is incorporated into the magnetic layer in an amount of from about 1 to about 10 parts by weight, and preferably from about 1 to about 5 parts by weight, based on 100 parts by weight of the primary pigment.

The binder system may also contain a conventional surfactant or wetting agent. Known surfactants, e.g., adducts of sulfuric, sulfonic, phosphoric, phosphonic, and carboxylic acids, are acceptable.

The coating composition may also contain a hardening agent such as isocyanate or polyisocyanate. In a preferred embodiment, the hardener component is incorporated into the upper layer in an amount of from about 1 to about 5 parts by weight, and preferably from about 1 to about 3 parts by weight, based on 100 parts by weight of the primary magnetic pigment.

The materials for the magnetic layer are mixed with the primary pigment and coated atop the lower layer. Useful solvents associated with the upper layer coating material preferably include cyclohexanone (CHO), with a preferred concentration of from about 5% to about 50%, methyl ethyl ketone (MEK) preferably having a concentration of from about 40% to about 90%, and toluene (Tol) of concentrations from about 0% to about 40%. Alternatively, other ratios can be employed, or even other solvents or solvent combinations including, for example, xylene, methyl isobutyl ketone, tetrahydrofuran, and methyl amyl ketone, are acceptable.

If a thin film magnetic layer is desired, a metal such as cobalt, cobalt chrome, cobalt nickel, cobalt chrome platinum, and other cobalt alloys is formed on the substrate by such methods as sputtering and vacuum evaporation.

The Optional Sub-Layer

The optional support layer of a dual-layer magnetic tape of the invention is essentially non-magnetic and includes non-magnetic powders and a resin binder system. By forming one or more essentially non-magnetic lower layers, the electromagnetic characteristics of the magnetic layer are not adversely affected.

An optional lower layer of magnetic recording media of the invention includes at least a primary pigment and a binder system therefor. Such support layers are used in combination with an upper magnetic layer to form a magnetic recording medium having high quality recording characteristics and good mechanical and handling properties. The binder system in support layers of dual-layer magnetic media of the invention has a lower Tg than the binder system utilized by the magnetic upper layer.

The primary lower layer pigment material consists primarily of non-magnetic particles such as iron oxides, titanium dioxide, alumina, tin oxide, titanium carbide, silicon carbide, silicon dioxide, silicon nitride, boron nitride, and the like.

In a preferred embodiment, the primary lower layer pigment material is a hematite material ($\alpha$-iron oxide), which can be acidic or basic in nature. In one embodiment, alpha-iron oxides are substantially uniform in particle size and annealed to reduce the number of pores. After annealing, the pigment is ready for surface treatment, which is typically performed prior to mixing with other layer materials such as carbon black and the like. Alpha-iron oxides are well known and are commercially available from Dowa Mining Company, Toda Kogyo, Sakai Chemical Industry Co, and others.

Conductive carbon black material provides a certain level of conductivity so as to provide the formulation with protection from charging with static electricity. The conductive carbon black material is preferably of a conventional type and widely commercially available. In one preferred embodiment, the conductive carbon black material has an average particle size of less than 20 nm, more preferably about 15 nm.

The support or lower layer may also include an alumina containing pigment. In one embodiment, such pigment is an aluminum oxide pigment. Other abrasive grains such as silica, $ZrO_2$, $Cr_2O_3$, etc., can also be employed, either alone or in mixtures with aluminum oxide. Such pigments are frequently referred to as head cleaning agents (HCA) due to the abrasive nature of the pigments.

The binder system or resin associated with the lower layer preferably incorporates at least one binder resin, such as a thermoplastic resin, in conjunction with other components. Additional components may include binders and surfactants used to disperse the HCA, a surfactant (or wetting agent), and one or more hardeners. The binder system of the lower layer has a lower Tg than the binder system utilized in the magnetic upper layer; useful Tg ranges for lower layers may vary with the desired magnetic layer formulation, but are generally less than about 72° C. Magnetic recording media formed using binder systems of the invention having such lower Tg values will have edges which show a substantial reduction in cracking when compared to dual-layer magnetic recording media using the same binder systems in both the magnetic upper layer and the lower support layer. In fact, at least one preferred embodiment of magnetic recording media of the invention shows substantially no cracking on the edges.

In one embodiment, the binder systems of the support layer contain a hard resin along with a soft resin. The soft resin has a Tg of less than about 60° C., preferably less than about 50° C. The hard resin has a Tg of at least about 72° C., preferably at least about 80° C.

The coating composition further may include an additional binder used as a dispersant, such as a polyurethane paste binder.

The binder system may also contain a conventional surfactant or wetting agent. Known surfactants, e.g., adducts of sulfuric, sulfonic, phosphoric, phosphonic, and carboxylic acids, are acceptable.

The binder system may also contain a hardening agent such as isocyanate or polyisocyanate. In a preferred embodiment, the hardener component is incorporated into the lower layer in an amount of 2 to 5 parts by weight, and preferably 3 to 4 parts by weight, based on 100 parts by weight of the primary lower layer pigment.

The support layer may further contain one or more lubricants such as a fatty acid and/or a fatty acid ester. As with the magnetic layer, the support layer includes stearic acid which is at least about 90% pure. Other acceptable fatty acids include myristic acid, palmitic acid, oleic acid, etc., and their mixtures. The support layer formulation can further include a fatty acid ester such as butyl stearate, isopropyl stearate, butyl oleate, butyl palmitate, butyl myristate, hexadecyl stearate, and oleyl oleate. The fatty acids and fatty acid esters may be employed singly or in combination. The lubricant is typically incorporated into the lower layer in an amount of from about 1 to about 10 parts by weight, and preferably from about 1 to about 5 parts by weight, based on 100 parts by weight based on the primary lower layer pigment combination.

The materials for the lower layer are mixed with the primary pigment and the lower layer is coated to the substrate. Useful solvents associated with the lower layer coating material preferably include cyclohexanone (CHO), with a preferred concentration of from about 5% to about 50%, methyl ethyl ketone (MEK) preferably having a concentration of from about 40% to about 90%, and toluene (Tol), of concentrations from 0% to about 40%. Alternatively, other ratios can be employed, or even other solvents or solvent combinations including, for example, xylene, methyl isobutyl ketone, tetrahydrofuran, and methyl amyl ketone, are acceptable.

The Back Coat

The back coat primarily consists of a soft non-magnetic particle material such as carbon black or silicon dioxide particles. In one embodiment, the back coat layer comprises a combination of two kinds of carbon blacks, including a primary, small carbon black component and a secondary, large texture carbon black component, in combination with appropriate binder resins. The primary, small carbon black component preferably has an average particle size on the order of from about 10 to about 50 nm, whereas the secondary, large carbon component preferably has an average particle size on the order of from about 50 to about 300 nm. The back coat of the magnetic recording medium of the present invention contains from about 25 to about 50 percent small particle carbon particles based on total composition weight, preferably from about 35 to about 50 percent based on total composition weight.

Back coat pigments are dispersed as inks with appropriate binders, surfactant, ancillary particles, and solvents. Preferably, the back coat binder includes at least one of a polyurethane resin, a phenoxy resin, and nitrocellulose blended appropriately to modify coating stiffness as desired.

Useful solvents to create dispersions of the invention include methyl ethyl ketone, toluene, and cyclohexanone, and mixtures thereof, as well as other solvents or solvent combinations including, for example, xylene, methyl isobutyl ketone, and methyl amyl ketone, are acceptable.

Process for Manufacture

In a magnetic recording medium using a particulate magnetic recording layer, the coating materials of the upper layer, lower layer, if any, and back coat are prepared by dispersing the corresponding powders or pigments and the binders in a solvent. For example, with respect to the coating material for the upper layer, the primary metal particle powder or pigment and the large particle carbon materials are placed in a high solids mixing device along with certain of the resins (i.e., polyurethane binder, non-halogenated vinyl binder, and surfactant) and the solvent, and processed for from about 1 to about 4 hours. The resulting material is processed in a high-speed impeller dissolver for about 30 to about 90 minutes, along with additional amounts of the solvent. Following this letdown processing, the resulting composition is subjected to a sandmilling or polishing operation. Subsequently, the HCA and related binder components are added, and the composition left standing for about 30 to about 90 minutes. Following this letdown procedure, the composition is processed through a filtration operation, and then stored in a mixing tank at which the hardener component and lubricants are added. The resulting upper layer coating material is then ready for coating.

Preparation of a sub-layer coating, when such a layer is used, entails a similar process, including high solids mixing of the pigment combination including the primary lower layer pigment, conductive carbon black material, and HCA with the binder and a solvent, for about 2 to 4 hours.

Finally, preparation of the back coat coating material preferably entails mixing the various components, including a solvent, in a planetary mixer or similar device, and then subjecting the dispersion to a sandmilling operation. Subsequently, the material is processed through a filtration operation in which the material is passed through a number of filters.

The process for manufacture of this type of magnetic recording medium may include an in-line portion and one or more off-line portions. The in-line portion includes unwinding the substrate or other material from a spool or supply. The substrate is coated with the backcoating on one side of the substrate, and next the backside coating is dried, typically using conventional ovens. A front coating is applied to the substrate; for the dual-layer magnetic recording media of the invention, the sub-layer or support layer is applied first, directly onto the substrate, and the magnetic coating is then coated atop the support layer. For single layer magnetic recording media, the magnetic layer is coated directly atop the substrate. Alternatively, the front coating can occur prior to the backcoating. The coated substrate is magnetically oriented and dried, and then proceeds to the in-line calendaring station. According to one embodiment, called compliant-on-steel (COS), in-line calendering uses one or more in-line nip stations, in each of which a steel or other generally non-compliant roll contacts or otherwise is applied to the magnetically coated side of the substrate, and a rubberized or other generally compliant roll contacts or otherwise is applied to the backcoated side. The generally non-compliant roll provides a desired degree of smoothness to the magnetically coated side of the substrate. Alternately, the in-line calendering is "steel-on-steel" (SOS), meaning both opposing rolls are steel. The process may also employ one or more nip stations each having generally non-compliant rolls. After in-line calendaring, the substrate or other material is wound. The process then proceeds to an off-line portion which occurs at a dedicated stand-alone machine. The coated substrate is unwound and then is calendered. The off-line calendering includes passing the coated substrate through a series of generally non-compliant rollers, e.g., multiple steel rollers, although materials other than steel may be used. The coated, calendered substrate then is wound a second time. The wound roll is then slit, burnished, and tested for defects according to methods known in the industry.

When a thin metal magnetic recording layer is used, a sputtering or evaporative process forms the metal onto the substrate. In one evaporative process, the substrate (and any intermediate layers) is transported past a vapor deposition apparatus, which continuously deposits a magnetic layer comprising cobalt, cobalt chrome, cobalt nickel, cobalt chrome platinum, or other cobalt alloys and/or their oxides, onto the substrate. The vapor deposition device can be any such device known in the industry including sputtering apparatus, vacuum deposition apparatus, or electron beam deposition apparatus. Preferred methods of deposition include vacuum deposition, which is conducted in a vacuum deposition chamber. The metal vapor can be introduced over a broad range of incident angles to the substrate surface, but is typically introduced at an average angle of from about 30 degrees to about 60 degrees.

What is claimed is:

1. A magnetic recording tape for use with a magnetic recording head comprising a substrate having a front side and a backside, a longitudinal direction and a cross-web direction, said substrate having a magnetic layer formed over said front side of said substrate comprising magnetic pigment particles, and a binder system therefor; said magnetic recording medium having a cross-web dimensional difference from a substrate wafer of an $Al_2O_3$—TiC bi-phase ceramic formed from aluminum oxide and titanium carbide of less than 900 microns/meter over a temperature range of about 35 degrees, and over a relative humidity range of about 70%, wherein said substrate is a substrate selected from the group consisting of nickel and glass, said substrate having a thickness of less than about 20 microns.

2. A magnetic recording tape according to claim 1, which has a total cross-web dimensional change less than 880 parts per million relative to a head with linear expansion of 7 ppm/deg C over a range of longitudinal stress due to the applied tension of 3.9 MPa, and with a 72 hour exposure at 50C under a uniaxial longitudinal stress of 7 MPa.

3. A magnetic recording tape according to claim 1, wherein said cross-web dimensional difference of said magnetic recording medium from said substrate wafer is less than 500 microns/meter over a humidity range of about 70% RH.

4. A magnetic recording of claim 1, wherein the substrate is glass.

5. A magnetic recording tape of claim 1, wherein the substrate is nickel.

6. A magnetic recording tape of claim 5, wherein the substrate is formed by electrolytically depositing the nickel temporarily on a transfer film.

7. A magnetic recording tape according to claim 6, wherein said transfer film is aluminum.

8. A magnetic recording tape according to claim 1, wherein said magnetic recording medium is used with a formed on a substrate wafer of an $Al_2O_3$—TiC bi-phase ceramic formed from aluminum oxide and titanium carbide.

9. A magnetic recording tape according to claim 1, wherein the magnetic layer comprises a ferromagnetic pigment, aluminum oxide, a spherical large particle carbon material having a particle size of from about 50 about 500 nm, a polyurethane binder, a non-halogenated vinyl binder, a hardener, a fatty acid ester lubricant, and a fatty acid lubricant.

10. A magnetic recording tape according to claim 1, wherein the magnetic layer comprises a ferromagnetic pigment, aluminum oxide, a spherical large particle carbon material having a particle size of from about 50 to about 500 mm a polyurethane binder, a polyvinylchloride binder, a hardener, a fatty acid ester lubricant, and a fatty acid lubricant.

11. A magnetic recording comprising a substrate selected from nickel and glass, a substrate wafer of an $Al_2O_3$—TiC bi-phase ceramic formed from aluminum oxide and titanium carbide medium having a front side and a backside, a magnetic layer formed over said front side of said substrate, said magnetic layer comprising a metal selected from the group consisting of cobalt, cobalt chrome, cobalt nickel, cobalt chrome platinum, and their oxides; said magnetic recording medium having a cross-web dimensional difference from said magnetic recording head of less than 900 microns/meter over a temperature range of about 35 degrees, and over a relative humidity range of about 70%, wherein said substrate has a thickness of less than about 20 microns.

12. A magnetic recording tape according to claim 11, wherein said cross-web dimensional difference of said magnetic recording medium from said substrate wafer is less than 500 microns/meter over a humidity range of about 70% RH.

13. A magnetic recording tape according to claim 11, wherein the substrate is glass.

14. A magnetic recording according to claim 11, wherein the substrate is nickel.

15. A magnetic recording tape of claim 14, wherein the substrate is formed by electrolytically depositing the nickel temporarily on a transfer film.

16. A magnetic recording tape according to claim 11, wherein said magnetic recording medium is used with a formed on a substrate wafer of an $Al_2O_3$—TiC bi-phase ceramic formed from aluminum oxide and titanium carbide.

17. A dual-layer magnetic recording tape comprising a substrate having a front side and a backside, a longitudinal direction and a cross-web direction, said substrate having a magnetic layer formed over said front side of said substrate comprising magnetic pigment particles, and a binder system therefor; said magnetic recording medium having a cross-web dimensional difference from a substrate wafer of an $Al_2O_3$—TiC bi-phase ceramic formed from aluminum oxide and titanium carbide of less than 900 microns/meter over a temperature range of about 35 degrees, and over a relative humidity range of about 70%, wherein said substrate is a nonpolymer substrate selected from the group consisting of nickel and glass, said substrate having a thickness of less than about 20 microns.

* * * * *

UNITED STATES PATENT AND TRADEMARK OFFICE
CERTIFICATE OF CORRECTION

PATENT NO. : 6,989,204 B2  Page 1 of 1
APPLICATION NO. : 10/874094
DATED : January 24, 2006
INVENTOR(S) : Zwettler et al.

It is certified that error appears in the above-identified patent and that said Letters Patent is hereby corrected as shown below:

Column 10
   Line 7 claim 8, "used with a" should read --used with a magnetic recording head--.
   Line 20 claim 10, "mm" should read --nm--.
   Line 23 claim 11, "magnetic recording comprising" should read --magnetic recording tape comprising--.
   Line 24 claim 11, "a substrate wafer of an Al2O3–TiC bi-phase ceramic formed from aluminum oxide and titanium carbide" should read --said magnetic recording--.
   Line 31 claim 11, "said magnetic recording head" should read --a substrate wafer of an Al2O3–TiC bi-phase ceramic formed from aluminum oxide and titanium carbide--.
   Line 47 claim 16, "used with a" should read --used with a magnetic recording head--.

Signed and Sealed this

Twenty-sixth Day of May, 2009

JOHN DOLL
*Acting Director of the United States Patent and Trademark Office*